(12) United States Patent
Yanagida et al.

(10) Patent No.: US 9,080,805 B2
(45) Date of Patent: Jul. 14, 2015

(54) COOLING STORAGE CABINET WITH DUAL EVAPORATORS AND AN INVERTER COMPRESSOR

(75) Inventors: Shinya Yanagida, Toyoake (JP); Naoshi Kondou, Toyoake (JP); Akira Suyama, Toyoake (JP)

(73) Assignee: Hoshizaki Denki Kabushiki Kaisha, Aichi (JP)

( * ) Notice: Subject to any disclaimer, the term of this patent is extended or adjusted under 35 U.S.C. 154(b) by 905 days.

(21) Appl. No.: 13/281,693

(22) Filed: Oct. 26, 2011

(65) Prior Publication Data

US 2012/0047932 A1 Mar. 1, 2012

Related U.S. Application Data

(62) Division of application No. 12/227,067, filed as application No. PCT/JP2007/057881 on Apr. 10, 2007, now abandoned.

(30) Foreign Application Priority Data

May 15, 2006 (JP) ................................ 2006-135564

(51) Int. Cl.
*F25D 21/00* (2006.01)
*F25D 21/06* (2006.01)
(Continued)

(52) U.S. Cl.
CPC ............ *F25D 11/022* (2013.01); *F25B 49/025* (2013.01); *F25D 29/00* (2013.01);
(Continued)

(58) Field of Classification Search
CPC ................. F25B 2600/021; F25B 5/02; F25B 2600/025; F25B 2600/0253; F25D 11/022

USPC .......... 62/220, 150, 151, 155, 156, 200, 228.1
See application file for complete search history.

(56) References Cited

U.S. PATENT DOCUMENTS 4,646,534 A * 3/1987 Russell .......................... 62/228.4
4,866,944 A * 9/1989 Yamazaki ........................ 62/160
(Continued)

FOREIGN PATENT DOCUMENTS

CN        1382949 A     12/2002
DE     198 46 860 A1     4/2000
(Continued)

OTHER PUBLICATIONS

International Search Report mailed May 22, 2007 for International Application No. PCT/JP2007/057881.
(Continued)

*Primary Examiner* — M. Alexandra Elve
*Assistant Examiner* — Henry Crenshaw
(74) *Attorney, Agent, or Firm* — Wenderoth, Lind & Ponack, L.L.P.

(57) ABSTRACT

A cooling storage cabinet includes a freezing compartment, a refrigerating compartment, a compressor, a three-way valve, and a control circuit. The control circuit is configured such that: when an internal temperature of the freezing compartment becomes lower than a lower limit temperature during R-compartment F-compartment alternate cooling, starting R-individual overcool preventing control is requested, the rotational speed of the compressor is decreased by one stage and, subsequently, the three-way valve enters "R-side open state", and individual cooling of the refrigerating compartment is executed; thereafter, every 30 seconds, the rotational speed of the compressor is decreased by one stage; when the refrigerating compartment temperature becomes lower than a lower limit temperature, stopping R-individual overcool preventing control is requested; and then, the process shifts to individual cooling of the freezing compartment, and after the freezing compartment again becomes lower than the lower limit temperature, the compressor is stopped.

9 Claims, 13 Drawing Sheets

(51) Int. Cl.
  *F25B 5/00*   (2006.01)
  *F25B 41/04*  (2006.01)
  *F25B 49/00*  (2006.01)
  *F25D 11/02*  (2006.01)
  *F25B 49/02*  (2006.01)
  *F25D 29/00*  (2006.01)
  *F25B 5/02*   (2006.01)

(52) U.S. Cl.
  CPC ............ *F25B 5/02* (2013.01); *F25B 2600/021* (2013.01); *F25B 2600/2511* (2013.01); *F25D 2700/10* (2013.01); *Y02B 30/741* (2013.01); *Y02B 40/32* (2013.01)

(56) References Cited

U.S. PATENT DOCUMENTS

| | | | | |
|---|---|---|---|---|
| 5,062,276 | A | * | 11/1991 | Dudley .......................... 62/176.6 |
| 5,699,674 | A | * | 12/1997 | Lee et al. ......................... 62/115 |
| 6,116,036 | A | * | 9/2000  | Canavesi et al. ................. 62/227 |
| 6,119,468 | A | * | 9/2000  | Seok ................................. 62/89 |
| 6,185,948 | B1 | * | 2/2001 | Niki et al. ....................... 62/199 |
| 6,370,895 | B1 | * | 4/2002 | Sakuma et al. ................. 62/199 |

FOREIGN PATENT DOCUMENTS

| | | |
|---|---|---|
| EP | 0 976 996 A2 | 2/2000 |
| EP | 0 990 862    | 4/2000 |
| EP | 1 030 147 A1 | 8/2000 |
| EP | 0 976 996 A3 | 11/2000 |
| EP | 1 087 186    | 3/2001 |
| EP | 1087186   *  | 3/2001 |
| EP | 1 564 513 A1 | 8/2005 |
| JP | 58-88559     | 5/1983 |
| JP | 11-304328    | 11/1999 |
| JP | 2000-230766  | 8/2000 |
| JP | 2001-133113  | 5/2001 |
| JP | 2003-207250  | 7/2003 |
| JP | 2005-016777  | 1/2005 |
| JP | 2005-121341  | 5/2005 |
| JP | 2005-188783  | 7/2005 |
| JP | 2005-265267  | 9/2005 |
| JP | 2006-078036  | 3/2006 |

OTHER PUBLICATIONS

Supplementary European Search Report issued Nov. 12, 2009 in European Patent Application No. EP 06 71 4337.
Supplementary European Search Report dated Jun. 29, 2010 in corresponding European Application No. 07741317.7.

* cited by examiner

FIG.4

| SET SPEED | FREQUENCY |
|---|---|
| 0TH SPEED | 30Hz |
| 1ST SPEED | 35Hz |
| 2ND SPEED | 40Hz |
| 3RD SPEED | 47Hz |
| 4TH SPEED | 55Hz |
| 5TH SPEED | 65Hz |
| 6TH SPEED | 76Hz |

COOLING STORAGE CABINET WITH DUAL EVAPORATORS AND AN INVERTER COMPRESSOR

This application is a Divisional of U.S. application Ser. No. 12/227,067 filed Nov. 6, 2008, now abandoned, which is a U.S. National Stage Application of International Application No. PCT/JP2007/057881, filed Apr. 10, 2007.

TECHNICAL FIELD

The present invention is related to a cooling storage cabinet having a plurality of evaporators and supplying refrigerant from a single compressor to the evaporators, and a method of operating the same.

BACKGROUND ART

A known cooling storage cabinet is described in Patent Document 1. In this art, a freezing compartment and a refrigerating compartment are formed by separating the inside of a heat-insulating storage cabinet body. The freezing compartment and the refrigerating compartment each are heat insulated. The freezing compartment and the refrigerating compartment each have respective set temperatures differing from each other. Each of the compartments has an evaporator, and a single compressor supplies refrigerant alternately to evaporators to cool the compartments.

More specifically, a cooling cycle is configured as follows. An inverter motor operates a compressor. An outlet side of the compressor is connected to a condenser. The downstream side of the condenser is branched in two refrigerant supply paths through a three-way valve. A capillary tube and one of the evaporators are installed in each of the refrigerant supply paths. Outlets of the evaporators each have a common connection and have a supply path back to the compressor. During operation of the compressor, refrigerant is supplied alternately to the two evaporators by switch of the three-way valve, whereby the freezing compartment and the refrigerating compartment are alternately cooled. In a case where the internal temperature of either one of the freezing compartment and the refrigerating compartment is lower than the set temperature, the other compartment is individually cooled. In a case where the internal temperatures of both of the freezing compartment and the refrigerating compartment are lower than the set temperatures, the compressor is stopped.

On the other hand, in the case where the compressor is operated by the inverter motor, it is proposed in some arts to cool each of the compartments along a predetermined temperature curve. For example, a target temperature curve is stored in advance, and then rotational speed of the compressor is controlled in response to a deviation between a target temperature and an actual internal temperature, and thereby the compartment is maintained at the target temperature. With this control method, a continuous ON time of the compressor can be longer. In other words, the number of switching between ON and OFF is significantly decreased. Thus, higher performance and energy consumption can be realized.

[Patent Document 1] Japanese Unexamined Patent Application Publication No. 2001-133113

Meanwhile, in the case of performing the control of the compressor as above, when cooling load is higher because of a circumstance such as a higher ambient temperature, the rotational speed of the compressor tends to be controlled at a higher speed. When the alternate cooling of the freezing compartment and the refrigerating compartment as shown in FIG. 12 is performed under such conditions and when the internal temperature of the freezing compartment becomes lower than the set temperature i.e. a temperature $T_{F(off)}$, the individual cooling of the refrigerating compartment is started. However, because of such a higher rotational speed of the compressor, there is a concern of over cooling capacity, which results in over cooling of the refrigerating compartment.

Here, in line with conditions of actual use, supposing a case where stored objects are placed on net racks 2 in the refrigerating compartment 1, faces of the net racks 2 are covered with plates 3 as shown in FIG. 13. Then, the temperature (a temperature curve y shown by dashed line in FIG. 12) at a point 5 above an uppermost net rack 2, which is in front of a cold air outlet from an internal fan 4, is rather lower than the temperature (a temperature curve x shown by solid line in the same figure) in the vicinity of an internal air inlet, where a R-compartment temperature sensor 6 is positioned. Admittedly, when the temperature detected by the R-compartment temperature sensor 6 becomes lower than the set temperature, i.e. reaches a temperature $T_{R(off)}$, the cold air stops blowing out. However, until that moment, the difference in temperature distribution may cause an over-cooled local zone such as the zone on the uppermost net rack 2. This is a problem.

The present invention was completed based on the circumstances as above, and it purpose is to prevent overcooling of the storage compartment in the case of switching from the alternate cooling of the plurality of storage compartments having different set temperatures to the individual cooling of the storage compartment having higher set temperature.

SUMMARY OF THE INVENTION

A method of operating a cooling storage cabinet in accordance with the present invention includes providing an inverter compressor, a condenser, a valve unit, a first and a second evaporators, constriction units configured to constrict refrigerant flowing into each of the evaporators, and a first and a second storage compartments, the first and the second storage compartments having respective set temperatures differing from each other, the first and the second storage compartments having the first and the second evaporators; supplying the refrigerant by the valve unit alternately to the evaporators, while changing a rotational speed of the inverter compressor based on deviations between the set temperatures of each storage compartment and internal temperatures of the same storage compartments, thereby alternately cooling each storage compartment so that the each of the compartments becomes closer to the set temperature; in a case where the internal temperature of either one of the first and the second storage compartments is lower than the set temperature, performing individual cooling of only the other storage compartment, and in a case where the internal temperatures of both of the storage compartments are lower than the respective set temperatures, stopping the inverter compressor; and in a case of alternately cooling the first and the second storage compartments with operation of the inverter compressor and, thereafter, switching to the individual cooling of one of the storage compartments having a higher set temperature, decreasing the rotational speed of the inverter compressor.

The cooling storage cabinet includes a freezing cycle, including an inverter compressor configured to have a changeable rotational speed, a condenser configured to dissipate heat from refrigerant compressed by the inverter compressor, a valve unit having an inlet and two outlets, the inlet being connected to the condenser side, the two outlets being connected to a first and a second refrigerant supply paths, the valve unit being configured to perform flow path switching operation to communicatively connect the inlet side thereof selectively with one of the first and the second refrigerant supply paths, a first and a second evaporators, each of the first and the second evaporators being configured to be provided in respective one of the first and the second refrigerant supply paths, constriction units, each of the constriction units being configured to constrict refrigerant flowing into one of the evaporators, and a refrigerant circulation path configured to provide a common connection between refrigerant outlet sides of the first and the second evaporators, the refrigerant circulation path being configured to be connected to an refrigerant inlet side of the inverter compressor; a storage cabinet body having a first and a second storage compartments, the first and the second storage compartments being configured to have set temperatures differing from each other and to be cooled by cold air generated by the first and the second evaporators; a first and a second temperature sensors, each of the first and the second temperature sensors being configured to detect internal temperature of respective one of the first and the second storage compartments; and an operation control means for, during operation of the inverter compressor, supplying the refrigerant by the valve unit alternately to the evaporators, while changing a rotational speed of the inverter compressor based on deviations between the set temperatures of the storage compartments each and internal temperatures of the same storage compartments, thereby alternately cooling the storage compartments each so that the each of the compartments becomes closer to the set temperature, in a case where the internal temperature of either one of the first and the second storage compartments is lower than the set temperature of the storage compartment, performing individual cooling of only the other storage compartment, and in a case where the internal temperatures of both of the storage compartments are lower than the respective set temperatures, stopping the inverter compressor; and a compressor control means for, in a case of alternately cooling the first and the second storage compartments accompanying with operation of the inverter compressor and, thereafter, switching to the individual cooling of one of the storage compartments having a higher set temperature, decreasing the rotational speed of the inverter compressor.

With the above configurations, in the alternative cooling of the two storage compartments, refrigerant is supplied by the switching operation of the valve unit alternately to the evaporators. Along with this, while the rotational speed of the inverter compressor is increased and decreased based on the deviations between the set temperatures and the internal temperatures of each storage compartments. Thus, the storage compartments are alternately cooled so that the two compartments become closer to the respective set temperatures. Here, in the case where the internal temperature of either one of the storage compartments becomes lower than the set temperature, only the other storage compartment is individually cooled. In this regard, specifically in the case of being switched to the individual cooling of the storage compartment having higher set temperature, the rotational speed of the inverter compressor is decreased at the time point where the switching operation is performed.

Here, when cooling load is higher because of a circumstance such as a higher ambient temperature, the rotational speed of the inverter compressor tends to be controlled at a higher speed in the alternate cooling and, if this tendency remains when switched to the individual cooling of the storage compartment having higher set temperature, overcooling is concerned.

In this view, in accordance with the present invention, when shifted to the individual cooling of the storage compartment having higher set temperature, the rotational speed of the inverter compressor is immediately decreased, i.e. cooling capacity is decreased.

In addition, the configuration may be as follows.

The compressor control means may include a function to decrease the rotational speed of the inverter compressor stage by stage at predetermined time intervals. Though it is more effective to drastically decrease the rotational speed of the inverter compressor for decreasing the cooling capacity. When the rotational speed is drastically decreased at once, however, motor oil can have trouble circulating inside the compressor, which may cause an oil shortage. In this view, in this configuration, the rotational speed is decreased stage by stage at predetermined intervals. Therefore, while the function of decreasing the cooling capacity is ensured, the motor oil can also desirably circulate.

The compressor control means may include a function to decelerate the inverter compressor to a speed not lower than a predetermined minimum rotational speed. With this configuration, in the case where the rotational speed of the inverter compressor is decelerated stage by stage, it is decelerated to a speed not lower than the predetermined minimum rotational speed. The intention is not to overly decrease the rotational speed, while contributing to sufficient decreasing of the cooling capacity by slowing to the minimum rotational speed. Thus, in a case of restarting the inverter compressor, cooling capacity can be rapidly recovered.

The cooling storage cabinet may include a control stop means for, in a case where a processing instruction to accelerate the inverter compressor is made during the individual cooling of one of the storage compartments having the higher set temperature, stopping the deceleration control of the inverter compressor. With this configuration, during the individual cooling of the storage compartment having higher set temperature, in a case where it is determined based on a deviation between the set temperature and the internal temperature to be undercooling and an instruction to accelerate the inverter compressor is made, the deceleration control of the inverter compressor is stopped. This prevents deficiency in cooling capacity deriving from a over decrease of the rotational speed of the inverter compressor.corrected/mjc

EFFECT OF THE INVENTION

In accordance with the present invention, when shifted to the individual cooling of the storage compartment having higher set temperature, the rotational speed of the inverter compressor is immediately decreased, i.e. the cooling capacity is decreased. This results in preventing local overcooling of the storage compartment in, for example, a vicinity of a cold air outlet.

BRIEF DESCRIPTION OF THE DRAWINGS

FIG. 4 is a table showing a relationship between set speeds and inverter frequencies of an inverter compressor;

DETAILED DESCRIPTION OF THE PRESENT INVENTION

An embodiment in accordance with the present invention will hereinafter be explained with reference to FIGS. 1 through 11. Illustrated in this embodiment is a freezer-refrigerator of horizontal type (table type) for commercial use.

Figure 1:
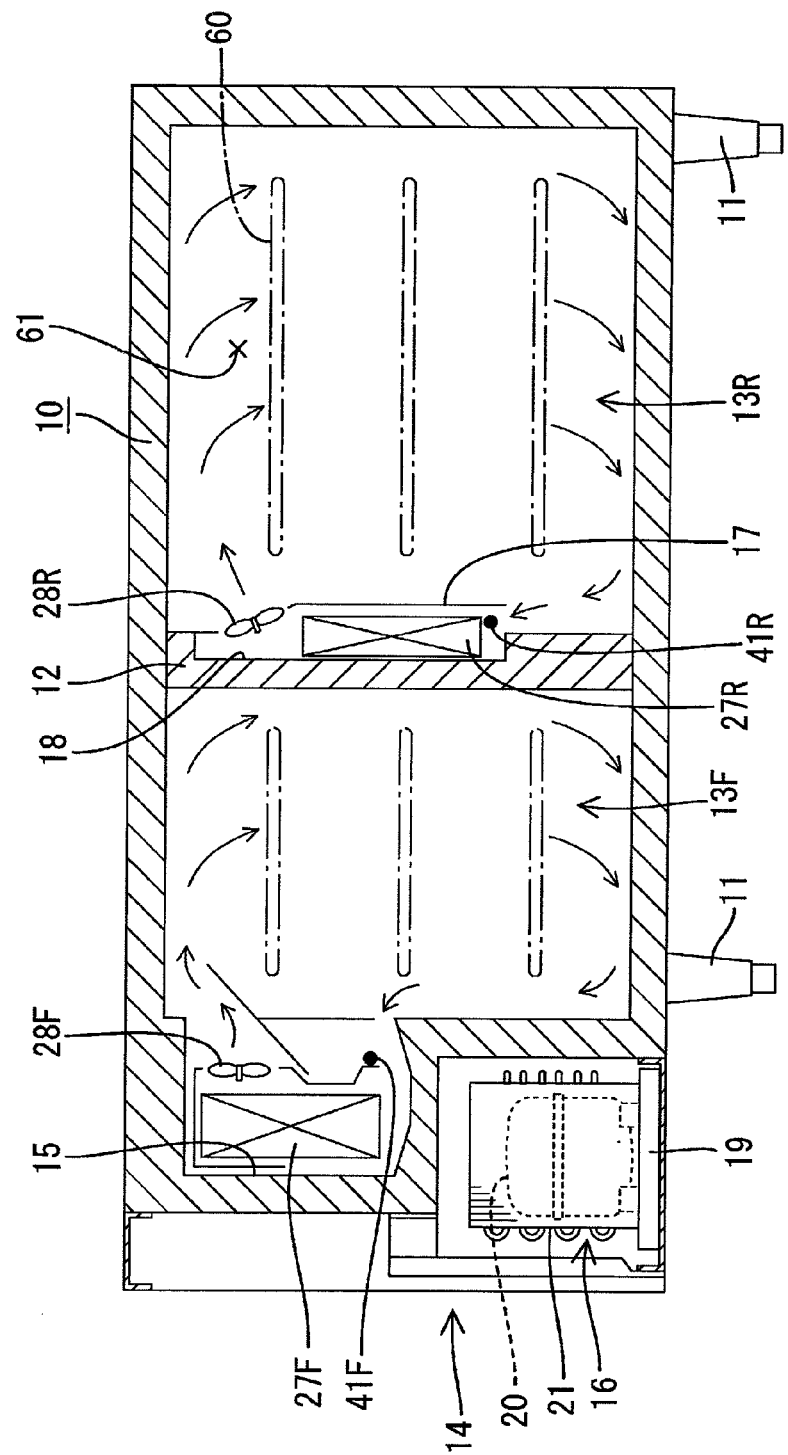
FIG. 1 is a cross-sectional view showing a general structure of a freezer-refrigerator of an embodiment in accordance with the present invention.

First, a general structure will be explained with reference to FIG. 1. Reference symbol 10 indicates a storage cabinet body, which is configured by a horizontally longer heat-insulating box body. The heat-insulating box body has an opening in front thereof. The storage cabinet body 10 is supported by legs 11. The legs 11 are provided in four corners on a bottom face of the storage cabinet body 10. The inside of the storage cabinet body 10 is separated into right and left sides by an additional heat-insulating partition wall 12. The left and relatively narrower side is defined as a freezing compartment 13F. The freezing compartment 13F corresponds to a first storage compartment. The right and wider side is defined as a refrigerating compartment 13R. The refrigerating compartment 13R corresponds to a second storage compartment. Note that each of the freezing compartment 13F and the refrigerating compartment 13R has an opening in the front face thereof. Pivotable heat-insulating doors (not illustrated) are mounted on the openings so as to be opened and closed.

The left portion of the storage cabinet body 10 viewed from the front thereof is provided with a machine compartment 14. A heat-insulating evaporator compartment 15 for the freezing compartment is convexly formed in the far upper side of the machine compartment 14. The evaporator compartment 15 is in communication with the freezing compartment 13F. An evaporator 27F and an internal fan 28F are provided in the evaporator compartment 15. A freezing unit 16 is accommodated below the evaporator compartment 15. The freezing unit 16 can be brought in and out from the place. A face of the partition wall 12 on the refrigerating compartment 13R side is covered by a duct 17, whereby a evaporator compartment 18 for the refrigerating compartment is formed. An evaporator 27R and an internal fan 28R are provided in the evaporator compartment 18.

The freezing unit 16 is configured by placing a compressor 20 and a condenser 21 on a base plate 19. The compressor 20 (that corresponds to an inverter compressor of the present invention) is operated by an inverter motor. The condenser 21 is connected to a refrigerant outlet side of the compressor 20. The freezing unit 16 can be brought in and out from the machine compartment 14. In addition, a condenser fan 22 (shown only in FIG. 2) is also mounted in the freezing unit 16.

Figure 2:
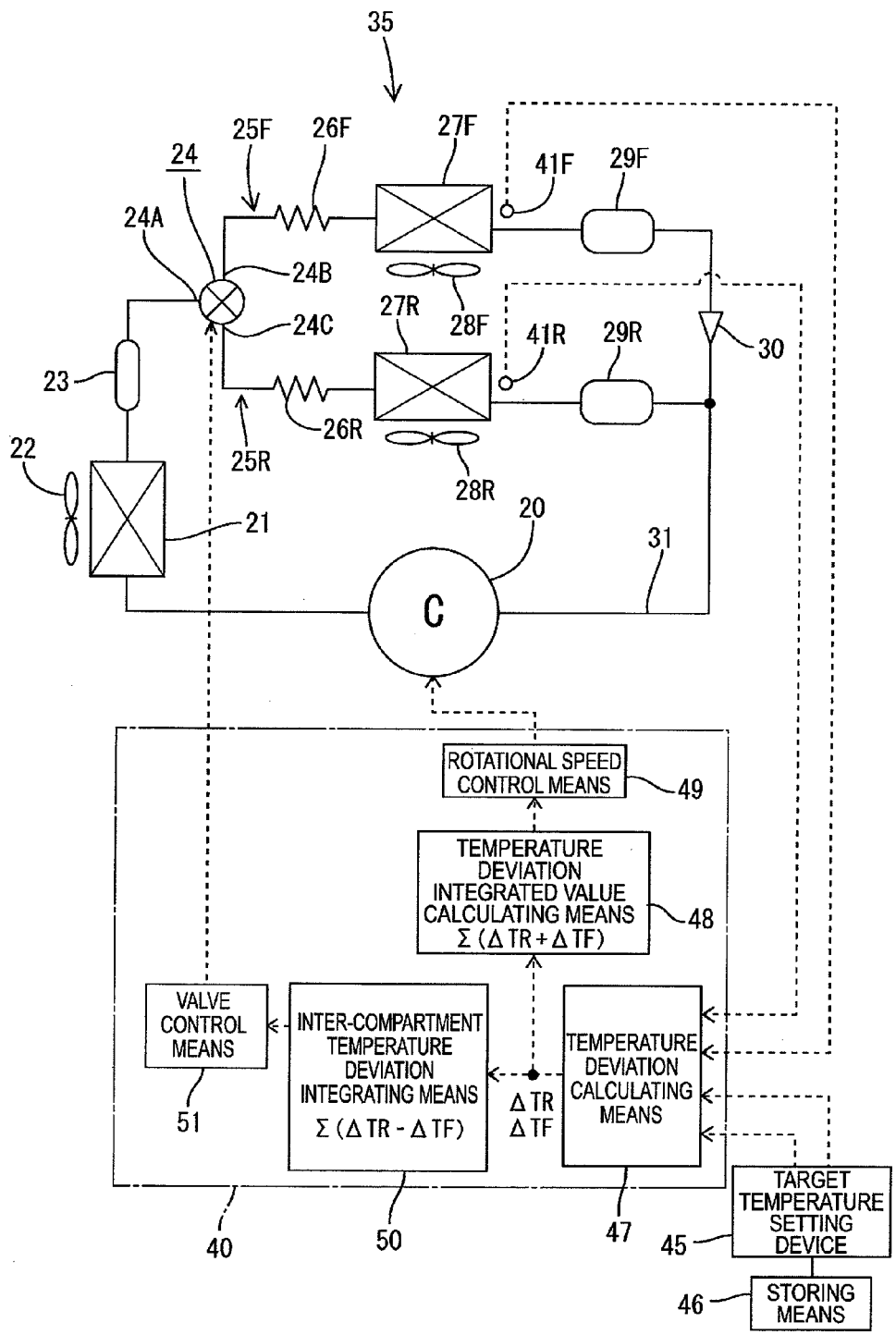
FIG. 2 is a configuration diagram of a freezing cycle and a block diagram of a control mechanism portion.
Figure 3:
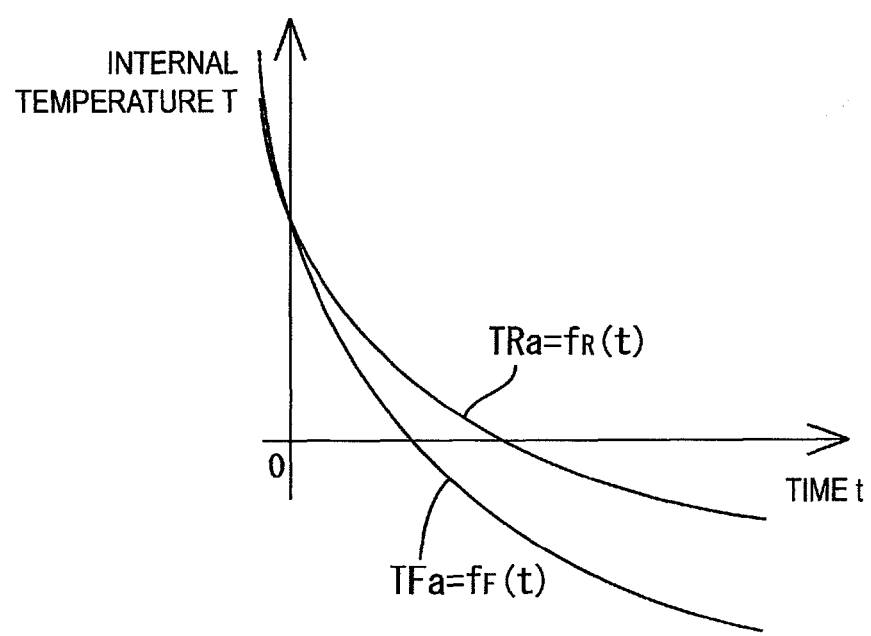
FIG. 3 is a graph showing time-varying change modes of target temperatures of a freezing compartment and a refrigerating compartment.

As shown in FIG. 2, an outlet side of the condenser 21 is connected to an inlet 24A of a three-way valve 24 through a drier 23. The three-way valve 24 is a valve unit in accordance with the present invention. The three-way valve 24 has the single inlet 24A and two outlets 24B, 24C. The outlets 24B, 24C each are connected to first and second refrigerant supply paths 25F, 25R, respectively. The three-way valve 24 can perform a flow path switching operation. In the flow path switching operation, the three-way valve communicatively connects the inlet 24 selectively to either one of the first and second refrigerant supply paths 25F, 25R.

The first refrigerant supply path 25F is provided with a capillary tube 26F for the freezing compartment and the evaporator 27F (a first evaporator) for the freezing compartment. The capillary tube 26F corresponds to a constriction unit. Likewise, the second refrigerant supply path 25R is provided with a capillary tube 26R for the refrigerating compartment and the evaporator 27R (a second evaporator) for the refrigerating compartment. The capillary tube 26R also corresponds to a constriction unit. Refrigerant outlets of the two evaporators 27F, 27R have a common connection, being connected to an accumulator 29F, a check valve 30, and an accumulator 29R in that order. The downstream side of the check valve 30 is branched and is connected to an inlet side of the compressor 20. A refrigerant circulation path 31 is thus provided. The circulation path of the refrigerant, which is from the outlet side to the inlet side of the compressor 20 as explained above, configures a freezing cycle 35. Refrigerant is supplied by the single compressor 20 to the two evaporators 27F, 27R through the freezing cycle 35. In the freezing cycle 35, the supply destination of liquid refrigerant can be changed by the three-way valve 24.

In this embodiment, refrigerant is supplied alternately to the evaporators 27F, 27R by switch of the three-way valve 24, and thereby the freezing compartment 13F and the refrigerating compartment 13R are alternately cooled. Furthermore, the freezing compartment 13F and the refrigerating compartment 13R each are cooled along predetermined respective temperature curves.

The compressor 20 and the three-way valve 24 are controlled by a freezing cycle control circuit 40 containing a CPU therein. The freezing cycle control circuit 40 receives signals from a freezer temperature sensor 41F (hereinafter referred to as the F-sensor 41F) and a refrigerator temperature sensor 41R (hereinafter referred to as the R-sensor 41R). The F-sensor 41F detects the air temperature in the freezing compartment 13F. The F-sensor 41F corresponds to a first temperature sensor. The R-sensor 41R detects the air temperature in the refrigerating compartment 13R. The R-sensor 41R corresponds to a second temperature sensor. The F-sensor 41F and the R-sensor 41R are disposed in a vicinity of an inlet of the freezing compartment evaporator compartment 15 and in a vicinity of an inlet of the refrigerating compartment evaporator compartment 18, respectively.

On the other hand, a target temperature setting device 45 is provided so as to output various target temperatures in series as time passes. In the target temperature setting device 45, the target temperatures of each of the freezing compartment 13F and the refrigerating compartment 13R are provided as a time-varying change mode (that is, a manner in which a target temperature is changed along with a time t). The target temperature change mode includes two change modes. One of the change modes is a target temperature change mode in control operation that cools stored items such as food at a set temperature set by the user. The other mode is a target temperature change mode in operation that is referred to as pull-down cooling operation that cools down the freezer-refrigerator that, for example, is first supplied with power after installation from a temperature rather higher than the set temperature of the control operation to a temperature zone of the control operation. Each of the change modes are represented by a function having time t as a variable for each of the freezing compartment 13F and the refrigerating compartment 13R, and the functions are stored in a storing means 46 configured by an EEPROM (and the like). For example, functions $T_{Fa}=f_F$ (t) and $T_{Ra}=f_R$ (t) can be illustrated by a graph shown in FIG. 3. These functions represent change modes of target temperatures $T_{Fa}$, $T_{Ra}$ of the freezing compartment 13F and the refrigerating compartment 13R, respectively, in the pull-down cooling operation.

The two target temperatures $T_F$, $T_{Ra}$ from the target temperature setting device 45 and two internal temperatures $T_F$, $T_R$ each obtained from the respective temperature sensors 41F, 41R are provided to a temperature deviation calculating means 47. The temperature deviation calculating means 47 then calculates each temperature deviation $\Delta T_F=(T_F-T_{Fa})$ and $\Delta T_R=(T_R-T_{Ra})$. Then, the values of the temperature deviations $\Delta T_F$, $\Delta T_R$ each are provided to a temperature deviation integrated value calculating means 48 and an inter-compartment temperature deviation integrating means 50, which are as follows.

In the temperature deviation integrated value calculating means 48, the control is performed to determine the rotational speed of the inverter motor that operates the compressor 20. Note that the set speeds (the rotational speeds) of the inverter motor can be switched in seven stages from zeroth speed to sixth. The relationship between the set speeds each and the inverter frequencies are as shown in FIG. 4.

For example, during a time period of 2 to 10 minutes (5 minutes in this embodiment), two deviations $\Delta T_F$, $\Delta T_R$ are summed and integrated, and the value is provided to a rotational speed control means 49. The rotational speed control means 49 compares the integrated value "A" with predetermined reference values (a lower limit value and an upper limit value). When the integrated value "A" is greater than the upper limit reference value L(A)_UP, the rotational speed of the inverter motor is increased. When the integrated value "A" is less than the lower limit reference value L(A)_DOWN, the rotational speed of the inverter motor is decreased. Note that the functions of the temperature deviation integrated value calculating means 48 and the rotational speed control means 49 are realized by a software executed by the CPU. A processing procedure of the software is shown with reference to FIG. 5.

That is, upon start of a compressor rotation control routine by the CPU, first, the integrated value A is initialized to, for example, 0 (step S11). Next, the target temperature setting device 45 reads out the predetermined functions from the storing means 46, and substitutes a variable t (an elapsed time from the start of this routine) in the function, and thereby calculates the target temperatures $T_{Ra}$, $T_{Fa}$ each of the refrigerating compartment 13R and the freezing compartment 13F (steps S12, S13), respectively. Then, the deviations $\Delta T_R$, $\Delta T_F$ between the target temperatures $T_{Ra}$, $T_{Fa}$ and the actual internal temperatures $T_R$, $T_F$ are calculated and integrated (the functions of the temperature deviation calculating means 47 and the temperature deviation integrated value calculating means 48: step S14). Then, the process goes to step S15, where the integrated value "A" is compared with the upper limit reference value L(A)_UP and the lower limit reference value L(A)_DOWN to increase or decrease the rotational speed of the inverter motor (the function of the rotational speed control means 49: steps S15 to S17).

Figure 5:
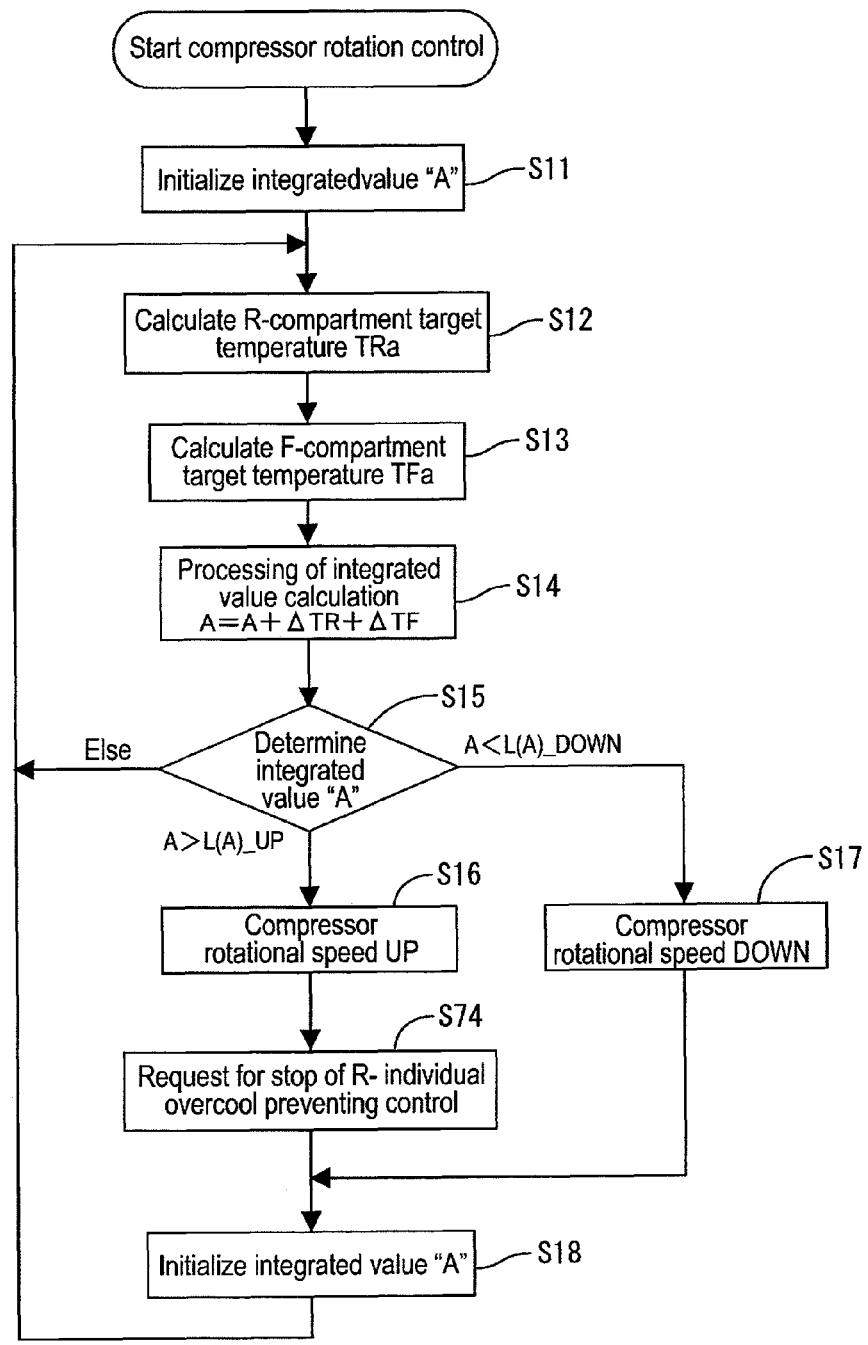
FIG. 5 is a flowchart showing a procedure for controlling a rotational speed of the compressor.
Figure 6:
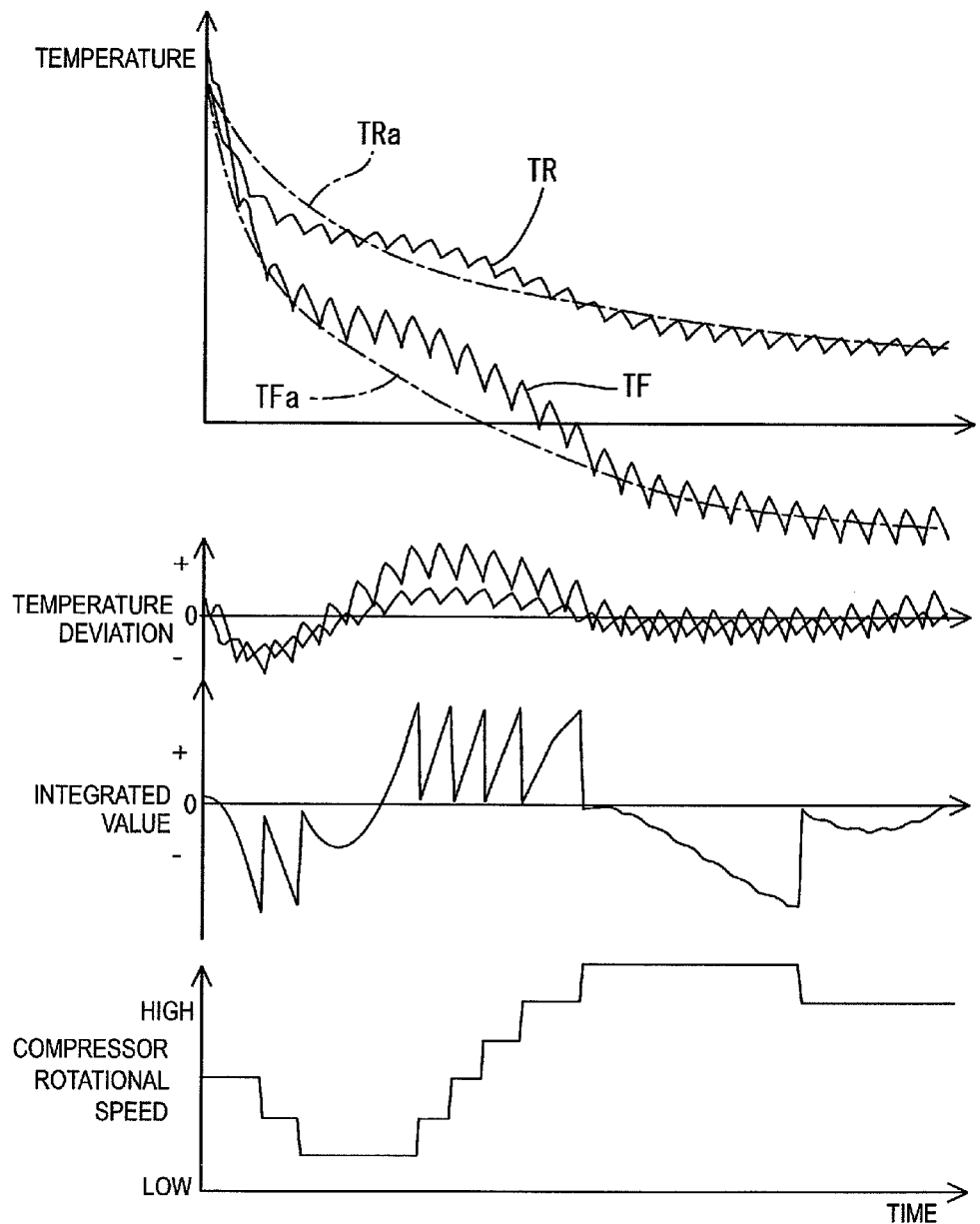
FIG. 6 is a graph showing a relationship between time-varying change modes of internal temperatures and rotational speeds of the compressor in pull-down cooling operation.
Figure 7:
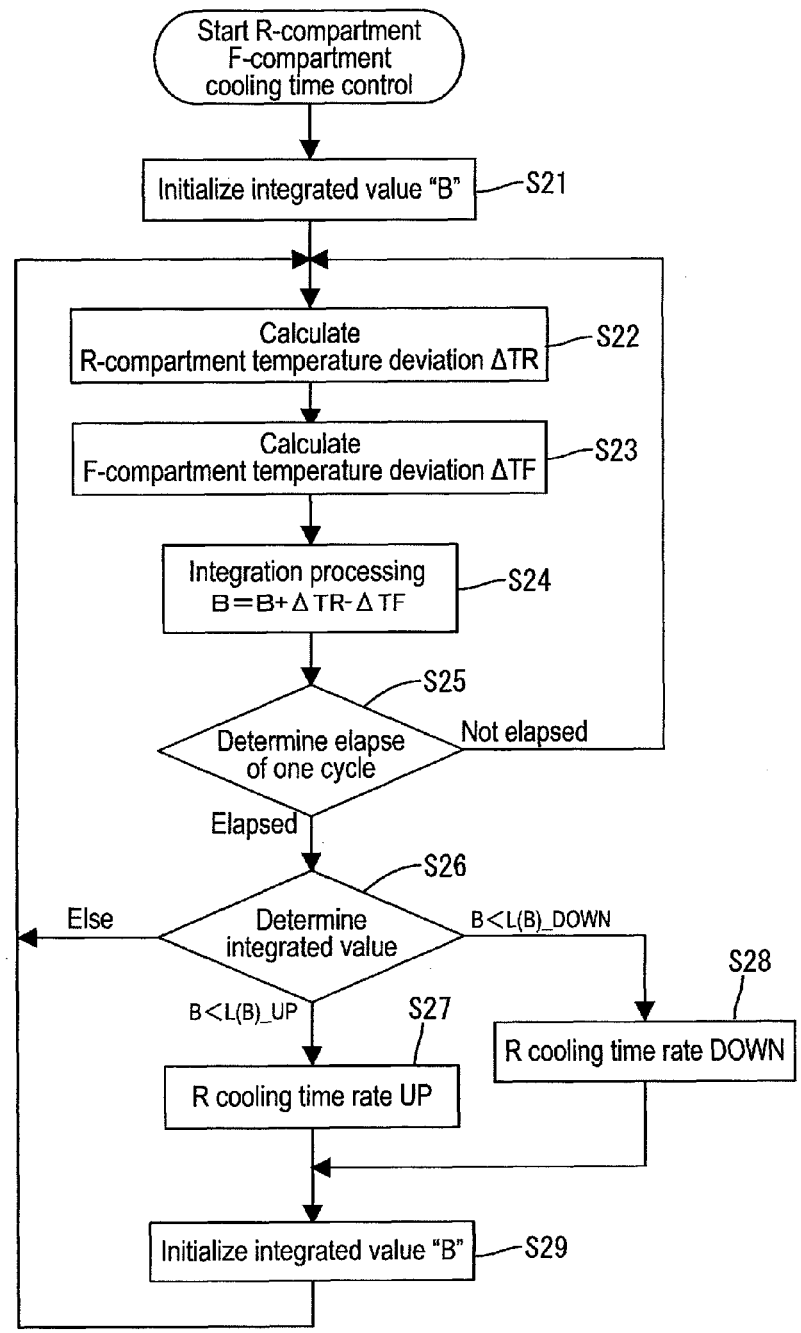
FIG. 7 is a flowchart showing a procedure for determining a time ratio of refrigerant supply to the refrigerating compartment and the freezing compartment.

With such control, suppose, for example, that the time-varying change modes of the target temperatures $T_{Ra}$, $T_{Fa}$ each of the refrigerating compartment 13R and the freezing compartment 13F are set as dashed-dotted lines in a graph shown FIG. 6, and that the actual internal temperatures $T_F$, $T_R$ of the refrigerating compartment 13R and the freezing compartment 13F are shown by solid lines in the graph. Then, during initial phases after starting the cooling operation, the refrigerating compartment 13R, for example, is cooled so that the internal temperature $T_R$ is still lower than the target temperature $T_{Ra}$, while the freezing compartment 13F side is cooled so that the internal temperature $T_F$ is substantially equal to the target temperature $T_{Fa}$. Accordingly, a total temperature deviation goes to minus, and the integrated value "A" also goes to minus. Here, a graph of the integrated value "A" shows a saw-tooth appearance because the integrated value A is initialized at every predetermined time (step S18 in FIG. 5). Then, since the integrated value "A" is minus and is lower than the lower limit reference value L(A)_DOWN, the inverter frequency is gradually reduced during the initial phases and, as the result, the rotational speed of the compressor 20 is decreased stage by stage, which decreases the cooling capacity. Accordingly, the internal temperatures come closer to the decreasing degrees of the target temperatures.

When the internal temperatures becomes higher than the target temperatures as the result of decrease in cooling capacity, the temperature deviations each of the freezing compartment 13F and the refrigerating compartment 13R, as well as the integrated value "A", shift to plus. When the total integrated value "A" becomes greater than the upper limit reference value L(A)_UP, the rotational speed of the compressor 20 is increased, which causes increase in cooling capacity. Accordingly, the internal temperatures again come close to the decreasing degrees of the target temperatures. Thereafter, such control is repeated, and thereby the internal temperatures are decreased in accordance with the time-varying change modes of the set target temperatures.

In addition, also in the control operation to cool the stored items such as food at the set temperatures set by the user, the upper limit values and the lower limit values are determined above and under the set temperatures, and the target temperature change modes, which represent how to temporally change the internal temperatures from the upper limit values to the lower limit values, are converted into functions and stored in the storing means 46, and in a manner similar to the pull-down cooling operation, the rotational speed of the compressor 20 is controlled.

With the above control method, deviations between the target temperatures read out from the target temperature setting device 45 and the internal temperatures detected by the sensors 41F, 41R are calculated and integrated at every predetermined time and, based on the comparison between the integrated value and the predetermined reference values, the rotational speed of the inverter motor that operates the compressor 20 is changed. Therefore, even if, for example, the heat-insulating doors of the storage cabinet body 10 are temporarily opened to cause the external air to flow into the compartments, and thereby the internal temperatures have temporarily risen, the rise of temperatures is rapidly cancelled by closing the heat-insulating doors. Therefore, as far as being observed as the integrated value "A" of the temperature deviations, there is no rapid change in the integrated value "A". Consequently, too much sensitive reaction of the freezing cycle control circuit 40, which would cause rapid increase of the rotational speed of the compressor 20, does not occur. The control is therefore stabilized.

Furthermore, in this embodiment, refrigerant is supplied by the switch of the three-way valve 24 alternately to the evaporators 27F, 27R to alternately cool the freezing compartment 13F and the refrigerating compartment 13R. In addition to this, ratio of refrigerant supply time to each of the evaporators 27F, 27R in a predetermined time is controlled.

As explained above, the values of the temperature deviations $\Delta T_F$, $\Delta T_R$ each calculated in the temperature deviation calculating means 47 are provided to the inter-compartment temperature deviation integrating means 50. The inter-compartment temperature deviation integrating means 50 has a function of calculating an "inter-compartment temperature deviation" based on the calculated temperature deviations $\Delta T_F$, $\Delta T_R$. The "inter-compartment temperature deviation" is a difference between the temperature deviations $\Delta T_F$, $\Delta T_R$ ($\Delta T_F - \Delta T_R$). The "inter-compartment temperature deviation" is integrated for a predetermined time (for example, for five minutes).

Then, in accordance with the value integrated by the inter-compartment temperature deviation integrating means 50, a valve control means 51 controls a ratio for opening the first and the second refrigerant supply paths 25F, 25R. Specifically, the ratio for opening the refrigerant supply paths 25F, 25R is controlled so that the ratio of R (the second refrigerant supply path 25R):F (the first refrigerant supply path 25F) is 3:7 as an initial ratio. Namely, the time rate to cool the refrigerating compartment 13R (a R-compartment individual cooling time rate) is 0.3. The R-compartment individual cooling time rate is changeable in a range of 0.1 to 0.9 in steps of 0.1. The temperature deviation calculating means 47, the inter-compartment temperature deviation integrating means 50, and the valve control means 51 are configured by software that is executed by the CPU. The specific control modes will be explained based on flowcharts shown in FIGS. 7 and 8.

Upon start of a control flow of "R-compartment F-compartment individual cooling time control", first, an integrated value "B" is initialized (step S21), and the deviation (R-compartment temperature deviation) $\Delta T_R$ between the actual internal temperature $T_R$ of the refrigerating compartment 13R and the target temperature $T_{Ra}$ of the refrigerating compartment 13R is calculated (step S22). Note that the $T_R$ is provided from the R-sensor 41R at that time point. Next, the deviation (F-compartment temperature deviation) $\Delta T_F$ between the actual internal temperature $T_F$ of the freezing compartment 13F and the target temperature $T_{Fa}$ of the freezing compartment 13F is calculated (step S23). Note that the $T_F$ is also provided from the F-sensor 41F at that time point. Then, the "inter-compartment temperature deviation", which is a difference ($\Delta T_R - \Delta T_F$) between the temperature deviations $\Delta T_R$, $\Delta T_F$ of the refrigerating compartment 13R and the freezing compartment 13F is calculated. Then, the inter-compartment temperature deviation ($\Delta T_F - \Delta T_R$) is integrated as the integrated value "B" (step S24). Then, in step S25, it is determined whether or not one cycle, which is set to a predetermined time, has elapsed. When the cycle has not elapsed, the steps S22 to S24 are repeated until elapse of the cycle to calculate the integrated value "B" of the one cycle.

Next, the integrated value "B" calculated in the step S24 is compared with an upper limit reference value L(B)_UP and a lower limit reference value L(B)_DOWN (step S26). When the integrated value "B" is greater than the upper limit reference value L(B)_UP, it indicates that the integrated value of the R-compartment temperature deviations $\Delta T_R$ is rather greater, and accordingly, the R-compartment individual cooling time rate $R_R$ is increased by one step (0.1) from the initial value 0.3. When the integrated value "B" is less than the lower limit reference value L(B)_DOWN, it indicates that the integrate value of the R-compartment temperature deviation $\Delta T_R$ is less while the F-compartment temperature deviation $\Delta T_F$ is rather greater, and, accordingly, the R-compartment individual cooling time rate $R_R$ is reduced by one step from the initial value 0.3 (step 28). Then, in step S29, the integrated value "B" is initialized, and the process returns to the step S22. Note that, when the integrated value "B" is between the upper limit reference value L(B)_UP and the lower limit reference value L(B)_DOWN, the process returns to the step S22 without changing the R-compartment individual cooling time rate $R_R$.

Figure 8:
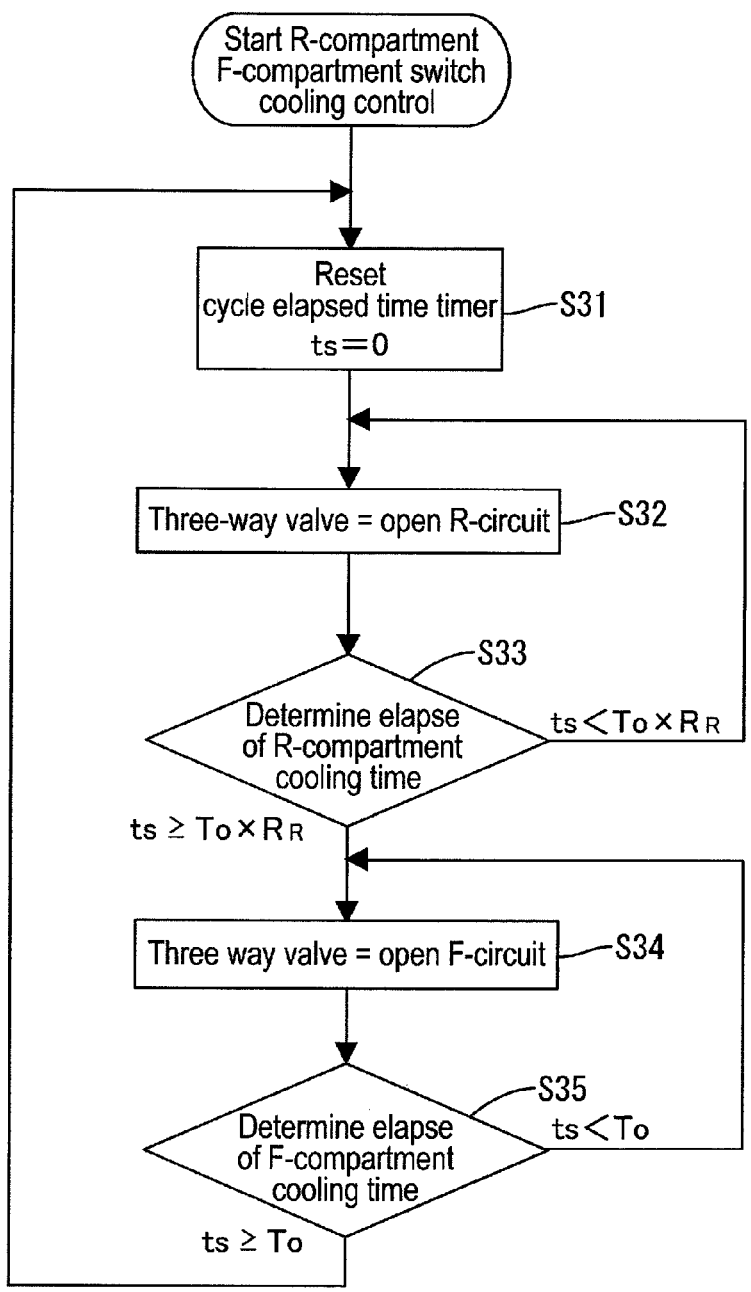
FIG. 8 is a flowchart showing a procedure for switch cooling control between the refrigerating compartment and the freezing compartment.

Upon determination of the R-compartment individual cooling time rate $R_R$ as explained above, a control flow of "R-compartment F-compartment switch cooling control" shown in FIG. 8 is executed. In this flow chart, first, a value is of a cycle elapsed time timer is reset (step S31), and the three-way valve 24 is switched to open the refrigerating compartment 13R side (the second refrigerant flow path 25R side) (step S32). Then, it is determined whether or not a cooling time of the refrigerating compartment 13R has elapsed (step S33). The steps S32, S33 are repeated to execute cooling of the refrigerating compartment 13R until elapse of the cooling time. Note that the cooling time of the refrigerating compartment 13R is calculated by multiplying a predetermined period $T_0$ (e.g. 5 minutes) by the R-compartment individual cooling time rate $R_R$.

Then, when the value is of the cycle elapsed time timer becomes equal to or greater than the value obtained by the multiplication of the period $T_0$ by the R-compartment individual cooling time rate $R_R$ ($T_0 * R_R$), this time, the three-way valve 24 is switched to open the freezing compartment 13F side (the first refrigerant flow path 25F side) (step 34). The step S34 and a step S35 are repeated to execute cooling of the freezing compartment 13F until elapse of the period $T_0$. Upon elapse of the period $T_0$, the process returns to the step S31, and the above cycle is repeated. As the result of this, while the one period $T_0$ of, for example, 5 minutes is passing, the refrigerating compartment 13R and the freezing compartment 13F are alternately cooled, with the time rates to cool them being determined by the R-compartment individual cooling time rate $R_R$.

Here, in determining the time ratio of refrigerant supply to the refrigerating compartment 13R and the freezing compartment 13F, suppose that control is performed simply to watch the deviations $\Delta T_R$, $\Delta T_F$ between the target temperatures and the actual internal temperatures of the storage compartments 13R, 13F each and perform longer cooling for the storage compartment having larger deviation $\Delta T_R$, $\Delta T_F$. Then, for example, when the heat-insulating door of one of the storage compartments is opened to cause the external air to flow into the storage compartment and thereby the internal temperature is temporarily increased. Then, refrigerant supply to the storage compartment is immediately increased. This would cause progression of cooling in spite that the door is closed and the internal temperature tends to return, and thus, overcooling of the storage compartment would be a concern. In contrast, in this embodiment, the difference between the deviations $\Delta T_R$, $\Delta T_F$ is obtained and, furthermore, integrated to obtain the integrated value "B", based on which the control is performed. Accordingly, even if the internal temperature temporarily rises, since there is no rapid change in the integrated value "B" of the temperature deviations, unnecessary change of the cooling time rates does not result. Cooling control is thus stabilized.

Under such an essential control as above, the freezing compartment 13F and the refrigerating compartment 13R are alternately cooled during operation of the compressor 20; in the case where the internal temperature of either one of the freezing compartment 13F and the refrigerating compartment 13R is lower than the set temperature, only the other is cooled; in the case where internal temperatures of both of the freezing compartment 13F and the refrigerating compartment 13R are lower than the set temperatures, the compressor 20 is stopped. This control will be now explained with reference to a flowchart of FIG. 9.

(Start of Cooling and R-Compartment F-Compartment Alternate Cooling)

Upon start of the compressor 20 (step S41), the three-way valve 24 performs flow path switching operation in accordance with the time rates as determined above, whereby the refrigerating compartment 13R and the freezing compartment 13F are alternately cooled (step S42). Next, the process goes to step S43. In the step S43, the temperature of the refrigerating compartment 13R and a preset refrigerating compartment lower limit temperature $T_{R(OFF)}$ are compared based on the signal from the R-sensor 41R. Furthermore, in step S44, the temperature of the freezing compartment 13F and a preset freezing compartment lower limit temperature $T_{R(OFF)}$ are compared based on the signal from the F-sensor 41F. In the initial phases of the cooling operation, since the internal temperature of neither of the compartments has reached the lower limit temperature, the process returns from the step S44 to the step S42 to perform the R-compartment F-compartment alternate cooling.

(F-Compartment Individual Cooling)

As cooling progresses and when the internal temperature of the refrigerating compartment 13R becomes lower than the preset refrigerating compartment lower limit temperature $T_{R(OFF)}$, the process shifts from the step 43 to step S45. In the step 45, the three-way valve 24 is switched to a "F-side open state", whereby only the freezing compartment 13F is cooled. Thereafter, the process shifts to step S46. In the step 46, it is determined based on the signal from the R-sensor 41R whether or not the internal temperature of the refrigerating compartment 13R has reached a preset refrigerating compartment upper limit temperature $T_{R(ON)}$.

Generally, right after when the R-compartment F-compartment alternate cooling ends, the refrigerating compartment 13R has been sufficiently cooled down. Accordingly, the process goes to the next step S47. In the step S47, it is determined based on the signal from the F-sensor 41F whether or not the internal temperature of the freezing compartment 13F has reached the preset freezing compartment lower limit temperature $T_{F(OFF)}$. The steps S45 to S47 are repeated until when the internal temperature of the freezing compartment 13F becomes lower than the lower limit temperature $T_{F(OFF)}$. As the result of this, only the freezing compartment 13F is cooled in a concentrated manner.

When the temperature of the refrigerating compartment 13R is raised in the course of the above cooling operation, the process returns from step S46 to step S42 to restart the R-compartment F-compartment alternate cooling. That is, since cooling of the refrigerating compartment 13R is also restarted, the temperature rise of the refrigerating compartment 13R can be rapidly depressed.

When the freezing compartment 13F is sufficiently cooled down by the "F-compartment individual cooling" and the internal temperature becomes lower than the freezing compartment lower limit temperature $T_{F(OFF)}$, the process shifts from the step S47 to step S48. In the step S48, the compressor 20 is stopped. Restart of the compressor 20 is prohibited until elapse of a compressor forced stop time T (step S49). While the compressor forced stop time T is passing, liquid refrigerant which is supplied to an evaporator 27F in the freezing compartment 13F side evaporates, whereby the pressure difference between the higher side and the lower side in the compressor 20 is cancelled.

(Restart of Compressor 20)

Upon elapse of the compressor forced stop time T in the step S49, the process goes to step 50. In the step 50, the temperature of the freezing compartment 13F and a preset freezing compartment upper limit temperature $T_{F(ON)}$ are compared based on the signal from the F-sensor 41F. Furthermore, in step S51, the temperature of the refrigerating compartment 13R and a preset refrigerating compartment upper limit temperature $T_{R(ON)}$ are compared based on the signal from the R-sensor 41R. When the temperature of the freezing compartment 13F or the refrigerating compartment 13R is higher than the upper limit temperature in either one of the steps, the compressor 20 is started (step S52 or S53). Then, the process shifts to the step S45 or to step S54 to restart cooling of the freezing compartment 13F or the refrigerating compartment 13R.

That is, provided that the temperature of either one of the freezing compartment 13F and the refrigerating compartment 13R becomes higher than the upper limit temperature, the compressor 20 starts.

(R-Compartment Individual Cooling)

On the other hand, in the case where the R-compartment F-compartment alternate cooling is being performed, in a case where the freezing compartment 13F ahead becomes lower than the freezing compartment lower limit temperature $T_{F(OFF)}$ (the step S44), the process shifts to step S54. In the step S54, the three-way valve 24 performs the flow path switching operation to a "R-side open state", whereby only the refrigerating compartment 13R starts to be cooled. Thereafter, the process shifts to step S55. In the step S55, it is determined based on the signal from the F-sensor 41F whether or not the internal temperature of the freezing compartment 13F has reached the preset freezing compartment upper limit temperature $T_{T(ON)}$. When the internal temperature of the freezing compartment 13F has not reached the freezing compartment upper limit temperature $T_{F(ON)}$, the process goes to the next step S56. In the step S56, it is determined based on the signal from the R-sensor 41R whether the internal temperature of the refrigerating compartment 13R has reached the preset refrigerating compartment lower limit temperature $T_{R(OFF)}$. The "R-compartment individual cooling" is executed until when the internal temperature of the refrigerating compartment 13R reaches the preset refrigerating compartment lower limit temperature $T_{R(OFF)}$.

Note that, when the temperature of the freezing compartment 13F has risen in the course of the control operation, the process returns from the step S55 to the step S42 to restart the R-compartment F-compartment alternate cooling.

When the temperature of the refrigerating compartment 13R is cooled down to the refrigerating compartment lower limit temperature $T_{R(OFF)}$ as the result of the "R-compartment individual cooling" (step S56), according to the prior art, both of the F- and R-compartments would be regarded to have been cooled down, and the compressor 20 would be stopped. In this embodiment in accordance with the present invention, the process again shifts to the "F-compartment individual cooling" (the step S45), whereby the temperature of the freezing compartment 13F is cooled down to the freezing compartment lower limit temperature $T_{F(OFF)}$ and, thereafter, the compressor 20 is stopped (the step S48).

Therefore, regardless of which one of the freezing compartment 13F and the refrigerating compartment 13R reaches the lower limit temperature first, the process is bound to the eventual cooling of the freezing compartment 13F to cool down its temperature to the lower limit temperature $T_{F(OFF)}$. This forestalls rise of the temperature of the freezing compartment 13F to an improper zone during the subsequent stop period of the compressor 20.

Figure 9:
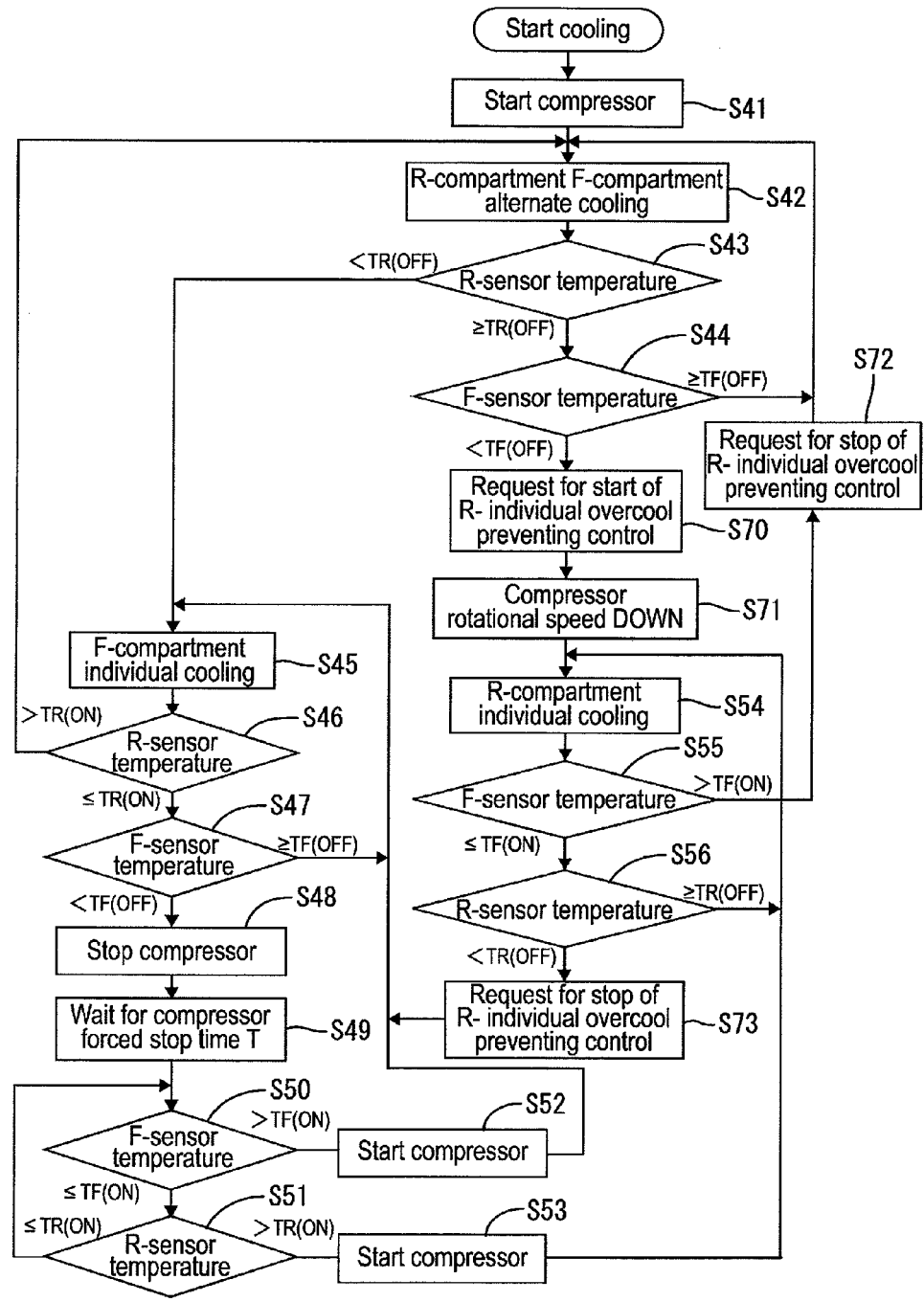
FIG. 9 is a flowchart showing cooling operation.
Figure 10:
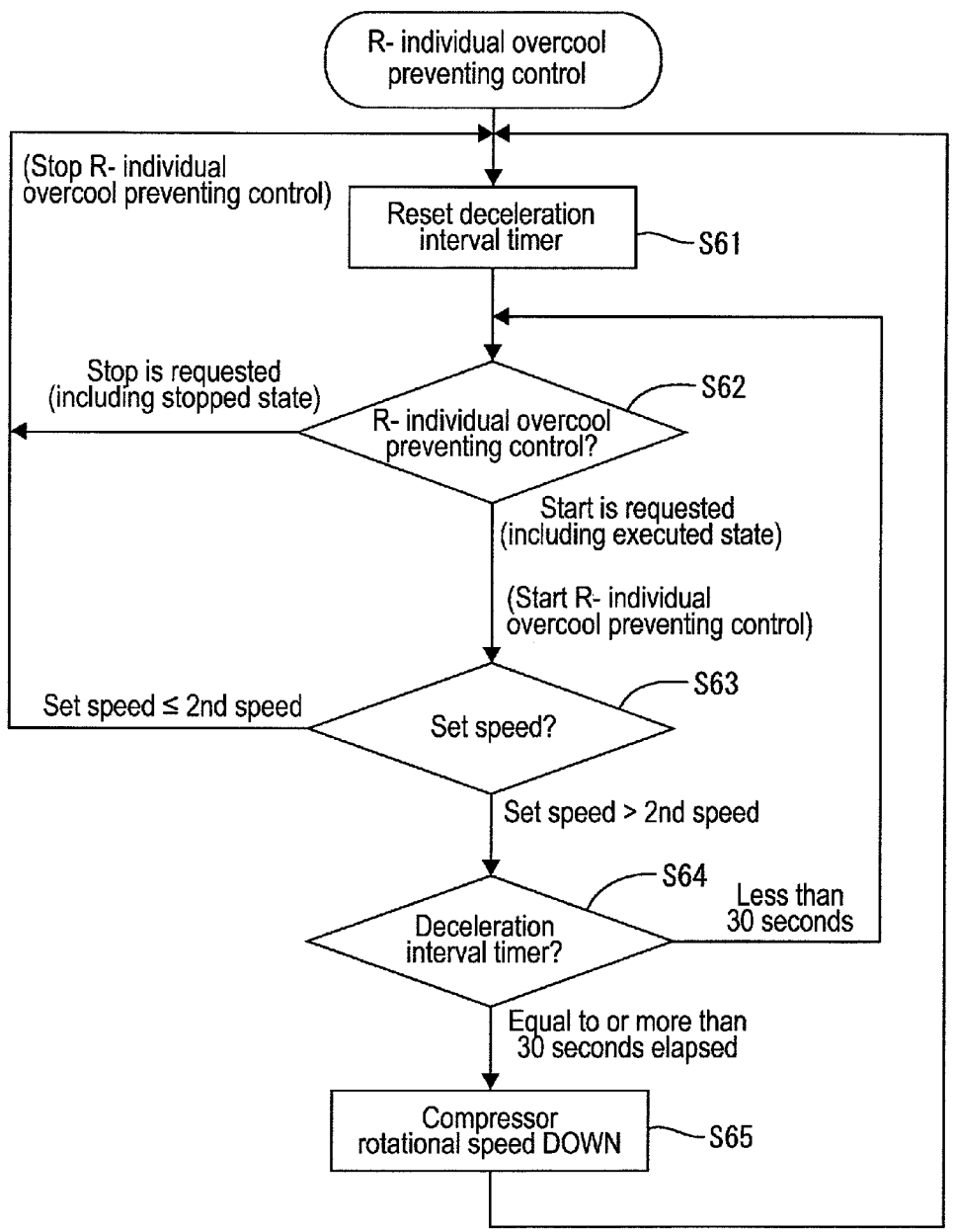
FIG. 10 is a flowchart concerning refrigerating compartment individual overcool preventing control.

Now, in this embodiment, a R-individual overcool preventing means is provided. The R-individual overcool preventing means prevents overcooling of the R-compartment, i.e. the refrigerating compartment 13R, specifically in the case of switching from the R-compartment F-compartment alternate cooling to the R-compartment individual cooling. In this means, control as shown in a flowchart of FIG. 10 is performed. The control is executed separately from the control shown in the flowchart of FIG. 9.

First, in step S61, a deceleration interval timer is reset. Thereafter, in step S62, it is determined whether start of "R-individual overcool preventing control" is requested (including the executed state) or stop of the control is requested (including the stopped state). In the case where the start is requested (in a case where a flag is ON), the process shifts to step S63.

In the step S63, the set speed of the compressor 20 at that time point (see FIG. 4) is detected and, when the set speed exceeds the "2nd speed", the process shifts to step S64. In this step, a measured time by the deceleration interval timer is detected, and the steps S62 to the steps S64 are repeated until when "30 seconds" elapses as the deceleration interval. When "30 seconds" has elapsed as the deceleration interval in the step S64, the rotational speed of the compressor 20 is decreased by one stage (step S65) and, thereafter, the process returns to the step S61. The operation as above is repeated as long as the flag is ON.

In the case where stop of the "R-individual overcool preventing control" is requested (in a case where the flag is OFF) in the course of the repeated operation, the process returns to the step S61 to stop the deceleration control of the compressor 20.

Furthermore, also in the case where it is determined in the step S63 that the set speed of the compressor 20 has been decelerated to the "2nd speed", the process returns to the step S61 to stop further deceleration control of the compressor 20.

Referring to the cooling operation shown in the flowchart of FIG. 9 as explained above, at the time point where the process shifts from the R-compartment F-compartment alternate cooling to the R-compartment individual cooling, i.e. during when the process shifts from the step S44 to the step S54, the request for start of the "R-individual overcool preventing control" is made (the flag is turned ON: step S70) and, subsequently, the rotational speed of the compressor 20 is decreased by one stage (step S71).

Note that at the time point where the process returns from the R-compartment individual cooling to the R-compartment F-compartment alternate cooling, i.e. during when the process shifts from the step S55 to the step S42, the request for stop of the "R-individual overcool preventing control" is made (the flag is turned OFF: step S72). Likewise, also in the case where the process shifts from the R-compartment individual cooling to the F-compartment individual cooling, i.e. in the case where the process shifts from the step S56 to the step S45, the request for stop of the "R-individual overcool preventing control" is made (the flag is turned OFF: step S73).

Furthermore, in the R-compartment individual cooling, performing the compressor rotation control shown in the flowchart of FIG. 5 to cool along the predetermined temperature curves, in the case where it is determined to be undercooling and an instruction to accelerate the inverter compressor is made (step S16), the request for stop of the "R-individual overcool preventing control" is likewise made (the flag is turned OFF: step S74) before the process shifts to the step S18.

Figure 11:
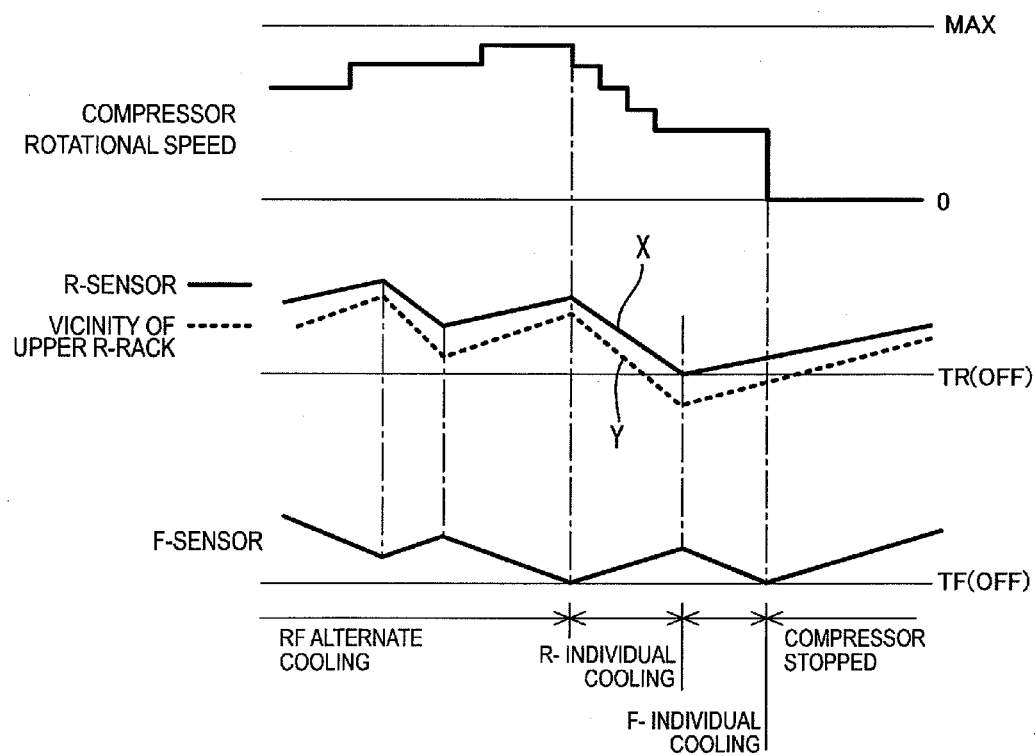
FIG. 11 is a timing chart showing changes of the rotational speed of the compressor and in temperature at each portion.
Figure 12:
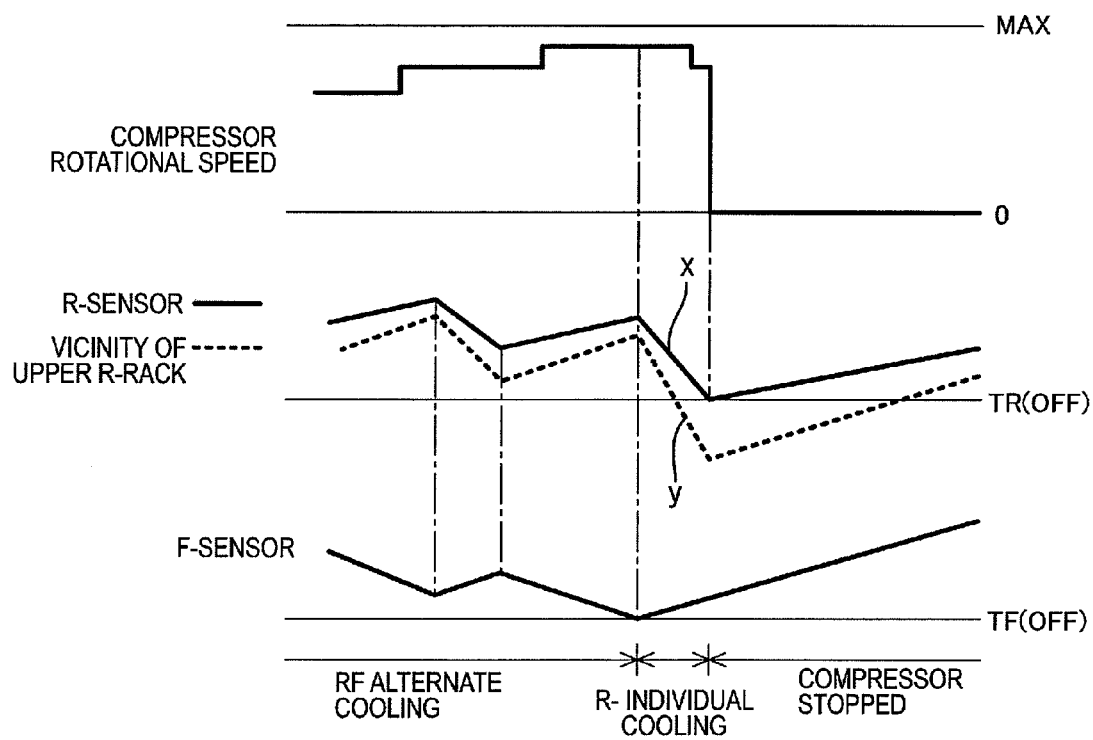
FIG. 12 is a timing chart showing change of a rotational speed of the compressor and change of a temperature at each portion of a known art.
Figure 13:
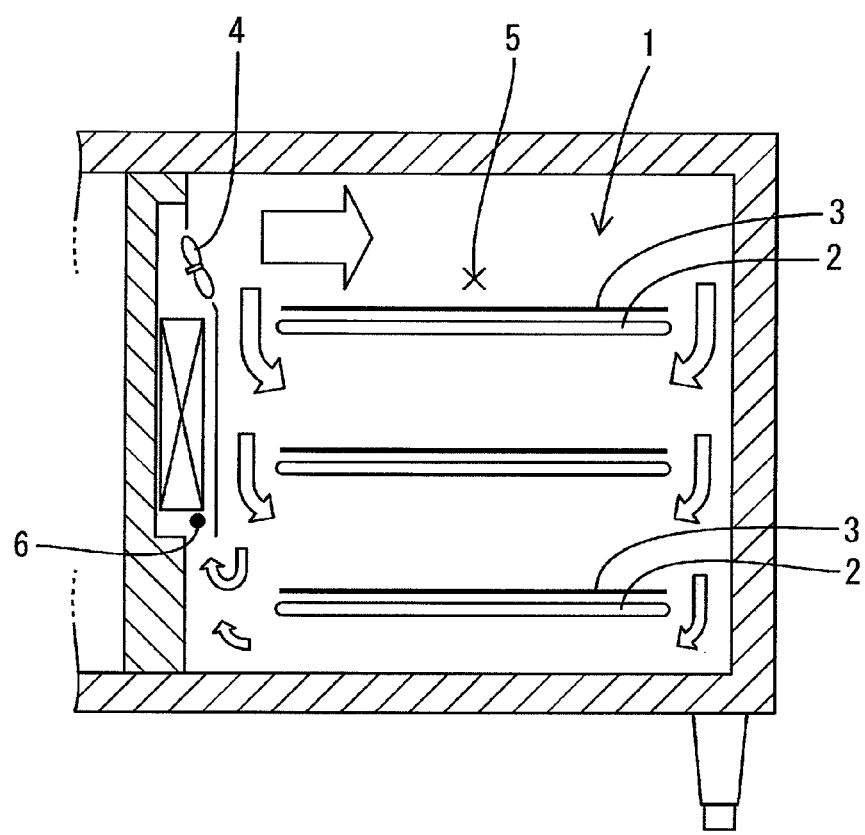
FIG. 13 is a cross-sectional view showing a cold air circulation mode inside a refrigerating compartment of the known art.

Next, control mainly of the case of shifting from the R-compartment F-compartment alternate cooling to the R-compartment individual cooling will be explained with reference to a timing chart of FIG. 11.

In the R-compartment F-compartment alternate cooling, the three-way valve 24 performs the flow path switching operation in accordance with the time ratio determined as above and, along with this, the rotational speed of the compressor 20 is controlled to follow the target temperature curves, thereby alternatively cooling the refrigerating compartment 13R and the freezing compartment 13F. Here, when cooling load is higher because of a circumstance such as a higher ambient temperature, the rotational speed tends to be controlled at a higher speed.

In such a state and when the internal temperature of the freezing compartment 13F becomes lower than the lower limit temperature $T_{F(OFF)}$, the request for start of the "R-individual overcool preventing control" is made (S70 in FIG. 9), and the rotational speed of the compressor 20 is decreased by one stage (step S71 in the same figure) and, subsequently, the three-way valve 24 performs the flow path switching operation to the "R-side open state". Thus, only the refrigerating compartment 13R is cooled (the R-compartment individual cooling: step S54 in the same figure).

During execution of the R-compartment individual cooling, the rotational speed of the compressor 20 is decreased by one stages at every 30 seconds elapsed from the start. Then, when the refrigerating compartment 13R becomes lower than the lower limit temperature $T_{R(OFF)}$, the request for stop of the "R-individual overcool preventing control" is made (the step S73 in FIG. 9) and, subsequently, the process shifts to the F-compartment individual cooling (the step S45 in the same figure). Thereafter, when the internal temperature of the freezing compartment 13F again becomes lower than the lower limit temperature $T_{F(OFF)}$, the compressor 20 is stopped (the step S48 in the same figure).

Note that, during when the rotational speed of the compressor 20 is decreased stage by stage, it is decreased to a speed not lower than the "2nd speed" (40 Hz). In addition, when the instruction to accelerate the compressor 20 is made during the R-compartment individual cooling, the "R-individual overcool preventing control" is stopped.

Thus, in this embodiment, when shifted to the R-compartment individual cooling, the rotational speed of the compressor 20 is drastically decreased in a short time, i.e. the cooling capacity is drastically decreased. Therefore, the manner of decrease in temperature (a temperature curve Y shown by dashed line in FIG. 11) at a point in front of the cold air outlet where the temperature is the lowest in the refrigerating compartment 13R, i.e. at a point 61 above an uppermost net lack 60, is also reduced at the same degree with the manner of decrease in temperature (a temperature curve X shown by solid line in the same figure) in the vicinity of the internal air inlet where the R-sensor 41R is located. As the result of this, generation of an overcooled local zone is prevented.

Note that, if the rotational speed of the compressor 20 is drastically decreased at once (for example, from 76 Hz to 40 Hz), motor oil can have trouble circulating inside the compressor, which may cause an oil shortage. In this embodiment, the rotational speed is decreased stage by stage at every 30 seconds. Therefore, the motor oil can also desirably circulate.

Furthermore, the compressor 20 is decelerated not lower than the predetermined minimum speed ("the second speed"). The intention here is not to over-decrease the rotational speed for the case of restarting the compressor 20, while contributing to sufficient reduction of the cooling capacity by decelerating to the "second speed".

Furthermore, in the case where the instruction to accelerate the compressor 20 is made in the R-compartment individual cooling, "the R-individual overcool preventing control" is stopped. Therefore, likewise, there is no concern of causing deficiency in cooling capacity deriving from over decrease of the rotational speed of the inverter compressor.

Note that the present invention is not limited to the embodiment explained as above with reference to the drawings. For example, the following embodiments are also included in the scope of the present invention.

(1) The time interval in the case of decreasing the rotational speed of the inverter compressor stage by stage is not limited to the "30 seconds" described in the above embodiment. It may be any other time interval, considering the number of stages, the inverter frequencies in the stages each, the capacity of the compressor, and the like.

(2) In determining the time ratio of refrigerant supply to the refrigerating compartment and the freezing compartment, it is not limited to be based on the integrated value of the deviations between the target temperatures and the actual internal temperatures of the storage compartments each as described in the above embodiment. It may be based on only the deviations. Furthermore, the time ratio of refrigerant supply may be fixed.

(3) In the case illustrated in the above embodiment, when cooling the storage compartments each along the predetermined temperature curves, the rotational speed of the inverter compressor is controlled based on the integrated value of the deviations between the target temperatures and the actual internal temperatures to maintain the storage compartments at the target temperatures. The rotational speed of the inverter compressor may be controlled based on only the deviations.

(4) In the above embodiment, when the internal temperatures of both of the storage compartments become lower than the set temperatures and the inverter compressor is stopped, the freezing compartment is bound to be eventually cooled. The control method may be such that the inverter compressor is stopped when the internal temperatures of both of the storage compartments become lower than the set temperatures regardless of which one is eventually cooled.

(5) In the above embodiment, the freezer-refrigerator having the freezing compartment and the refrigerating compartment is illustrated. The present invention is not limited to this. The cooling storage cabinet may be a one having a refrigerating compartment and a thawing compartment, two refrigerating compartments or two freezing compartments that differ from each other in storing temperature, or the like. The essential point is that the cooling storage cabinet has storage cabinets which set temperatures differ from each other, and that refrigerant is supplied from a shared compressor to evaporators each provided in the respective storage cabinets. The present invention may be applied broadly and all-round to such cooling storage cabinets.

The invention claimed is:

1. A cooling storage cabinet comprising:
a first storage compartment, an internal temperature of which is controlled to a first target temperature;
a second storage compartment, an internal temperature of which is controlled to a second target temperature that is higher than the first target temperature;
a compressor configured to compress a refrigerant and including an inverter motor configured to drive the compressor;
a condenser connected to the compressor and configured to dissipate heat from the refrigerant compressed by the compressor;
a valve including an inlet, a first outlet, and a second outlet, the inlet being connected to the condenser;
a first evaporator connected to the first outlet of the valve;
a second evaporator connected to the second outlet of the valve;
a first temperature sensor configured to detect internal temperatures of the first storage compartment;
a second temperature sensor configured to detect internal temperatures of the second storage compartment;
a target temperature setting device configured to calculate the first target temperature and the second target temperature by functions of time, respectively; and
a control circuit configured to:
control the valve to switch between the first outlet and second outlet being open to alternately supply the refrigerant to the first evaporator and the second evaporator;
receive one of the internal temperatures of the first storage compartment from the first temperature sensor;
determine whether the one of the internal temperatures of the first storage compartment is lower than a first compartment lower limit;
receive one of the internal temperatures of the second storage compartment from the second temperature sensor;
determine whether the one of the internal temperatures of the second storage compartment is lower than a second compartment lower limit in determining that the one of the internal temperatures of the first storage compartment is lower than the first compartment lower limit;
control the valve to close the first outlet and open the second outlet in determining that the one of the internal temperatures of the second storage compartment is not lower than the second compartment lower limit;
receive the internal temperatures of the first storage compartment from the first temperature sensor for a predetermined period in determining that the one of the internal temperatures of the second storage compartment is not lower than the second compartment lower limit;
receive the first target temperature from the target temperature setting device for a predetermined period in determining that the one of the internal temperatures of the second storage compartment is not lower than the second compartment lower limit;
calculate first deviations of the internal temperatures of the first storage compartment from the first target temperature;
receive the internal temperatures of the second storage compartment from the second temperature sensor in determining that the one of the internal temperatures of the second storage compartment is not lower than the second compartment lower limit;
receive the second target temperature from the target temperature setting device in determining that the one of the internal temperatures of the second storage compartment is not lower than the second compartment lower limit;

calculate second deviations of the internal temperatures of the second storage compartment from the second target temperature;

accumulate the first deviations and the second deviations;

determine whether a first accumulated value obtained through the accumulation of the first deviations and the second deviations is larger than an upper limit;

increase a rotation speed of the inverter motor in determining that the first accumulated value is larger than the upper limit;

determine whether the first accumulated value is smaller than a lower limit;

reduce the rotation speed of the inverter motor in determining that the first accumulated value is smaller than the lower limit;

subtract the first deviations from the second deviations;

accumulate differences between the first deviations and the second deviations obtained through the subtraction;

determine whether a second accumulated value obtained through the accumulation of the differences between the first deviations and the second deviations obtained through the subtraction is larger than an upper limit;

control the valve to open the second outlet for a period longer than an initial period in determining that the second accumulated value is larger than the upper limit;

determine whether the second accumulated value is smaller than a lower limit; and control the valve to open the second outlet for a period shorter than the initial period in determining that the second accumulated value is smaller than the lower limit.

2. The cooling storage cabinet according to claim 1, wherein the control circuit is further configured to decrease the rotational speed of the inverter motor stepwise at predetermined time intervals.

3. The cooling storage cabinet according to claim 2, wherein the control circuit is further configured not to decrease the rotational speed of the inverter motor lower than a predetermined minimum rotational speed.

4. The cooling storage cabinet according to claim 2, wherein the control circuit is further configured to stop decreasing the rotational speed of the inverter motor in determining that the first accumulated value is larger than the upper limit while the first outlet is closed and the second outlet is open.

5. The cooling storage cabinet according to claim 3, wherein the control circuit is further configured to:

determine whether the one of the internal temperatures of the second storage compartment is lower than the second compartment lower limit while the first outlet is closed and the second outlet is open;

determine whether the one of the internal temperatures of the first storage compartment is lower than the first compartment lower limit in determining that the one of the internal temperatures of the second storage compartment is lower than the second compartment lower limit while the first outlet is closed and the second outlet is open; and stop the inverter motor in determining that the one of the internal temperatures of the first storage compartment is lower than the first compartment lower limit.

6. The cooling storage cabinet according to claim 5, wherein the control circuit is further configured to open the first outlet and close the second outlet in determining that the one of the internal temperatures of the first storage compartment is lower than the first compartment lower limit.

7. The cooling storage cabinet according to claim 2, wherein the control circuit is further configured to:

select a level of the inverter motor from predetermined levels corresponding to rotational speeds of the inverter motor and set the level for driving the inverter motor at the level;

determine whether the level is lower than a reference level;

drive the inverter motor at the level in determining that the level is not lower than the reference level;

determine whether a predetermined interval for driving the inverter motor has elapsed;

decrease the level of the inverter motor by one level in determining that the predetermined interval has elapsed;

determined whether the decreased level is lower than the reference level; and not to perform further determination of whether the level is lower than the reference level in determining that the decreased level is lower than the reference level.

8. The cooling storage cabinet according to claim 7, wherein the control circuit is further configured to:

set a flag in determining that the one of the internal temperatures of the second storage compartment is not lower than the second storage compartment lower limit;

perform the determination of whether the level is lower than the reference level while the flag is set;

determine whether the one of the internal temperatures of the second storage compartment is lower than the second storage compartment lower limit while the flag is set; and clear the flag in determining that the one of the internal temperatures of the second storage compartment is lower than the second storage compartment lower limit.

9. The cooling storage cabinet according to claim 8, wherein the control circuit is further configured to clear the flag in determining that the first accumulated value is larger than the upper limit.

* * * * *